United States Patent [19]

Guienne et al.

[11] 4,060,147
[45] Nov. 29, 1977

[54] VEHICLES RIDING ON AIR CUSHIONS

[75] Inventors: Paul Guienne, Neuilly sur Seine; Guy Herrouin, Paris; Andre Lafont, Coudoux, all of France; Jean Bertin, deceased, late of Neuilly sur Seine, France; by Michel Bertin, Neuilly sur Seine, France; by Laurent Bertin, Neuilly sur Seine, France; by Philippe Bertin, Neuilly sur Seine, France; by Catherine Midy nee Bertin, Neuilly sur Seine, France; by Francoise Gonzalez-Camino nee Bertin, Madrid, Spain; by Geneviève Bertin nee Loustau, heirs, Neuilly sur Seine, France

[73] Assignees: Bertin & Cie, Plaisir; Societe d'Etudes et de Developpement des Aeroglisseurs Marins, Terrestres et Amphibies S.E.D.A.M., Paris, both of France

[21] Appl. No.: 657,120

[22] Filed: Feb. 11, 1976

[30] Foreign Application Priority Data

Feb. 18, 1975 France .................. 75.04960

[51] Int. Cl.² .................. B60V 1/04; B60V 1/11
[52] U.S. Cl. .................. 180/121; 180/127
[58] Field of Search ............. 180/127, 121, 116, 117, 180/118, 120; 114/67 A

[56] References Cited

U.S. PATENT DOCUMENTS

| 3,384,197 | 5/1968 | Bingham et al. | 180/117 |
| 3,438,457 | 4/1969 | Guienne et al. | 180/121 |
| 3,513,933 | 5/1970 | Faure | 180/127 X |
| 3,561,559 | 2/1971 | Delamare | 180/127 |
| 3,680,657 | 8/1972 | Marchetti et al. | 180/121 |
| 3,811,527 | 5/1974 | Pont et al. | 180/121 |
| 3,951,227 | 4/1976 | Lafont | 180/127 X |

Primary Examiner—Kenneth H. Betts
Attorney, Agent, or Firm—Alan H. Levine

[57] ABSTRACT

A vehicle riding on air cushions in which the lift of a platform is ensured by an arrangement of flexible skirts defining a central air-lift area at substantially constant pressure and a partitioned peripheral air-lift area. A closed loop of adjacent tubular skirts is inserted between the central and peripheral air-lift areas to increase the flying stability of the vehicle.

9 Claims, 6 Drawing Figures

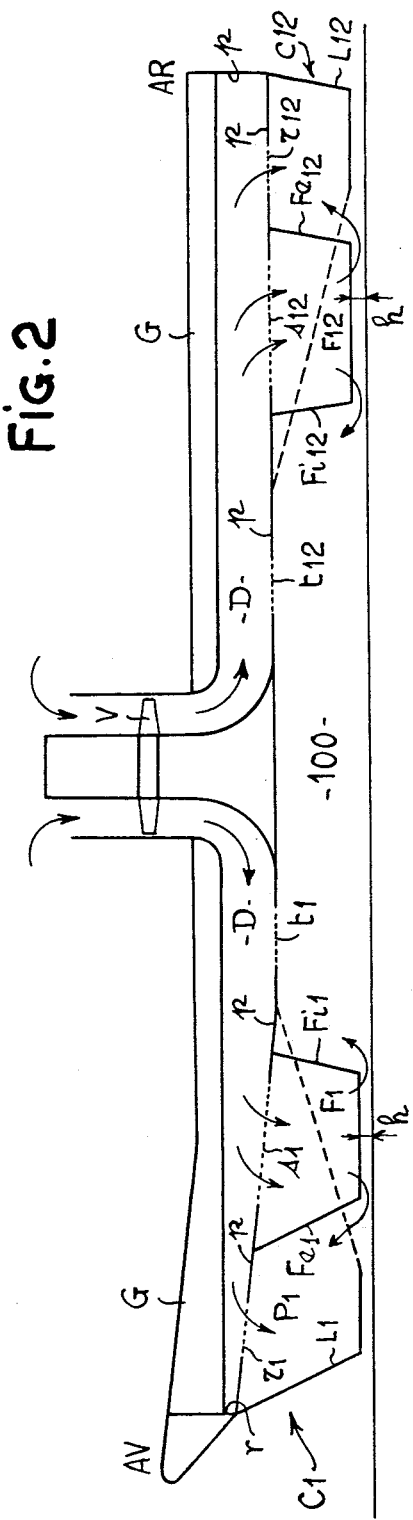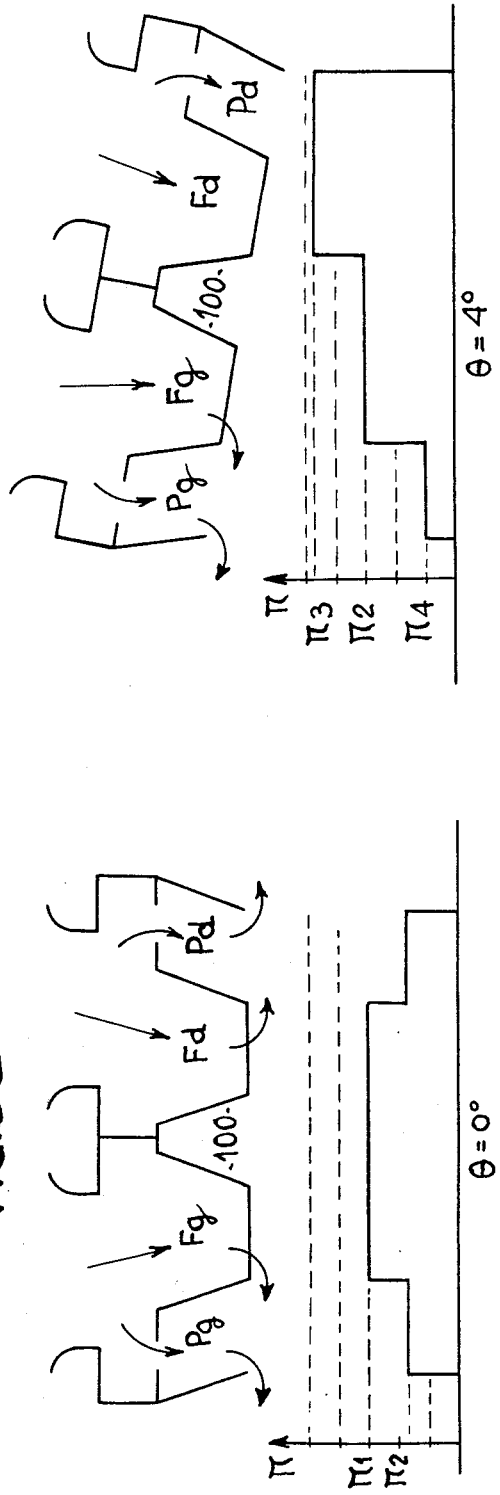

VEHICLES RIDING ON AIR CUSHIONS

The present invention relates to vehicles or machines which ride on cushions of fluid under pressure, so-called ground effect machines. Hereinafter, these will be referred to as air-cushioned vehicles.

Air-cushioned vehicles are already known and can comprise a platform, whereof the lift is ensured by a central air cushion located below the middle region of the platform and by a peripheral arrangement divided into several air cushions, located below the peripheral region of the platform. In these vehicles, as a general rule, the central cushion is defined by an inner peripheral wall whereas the peripheral arrangement comprises a number of skirts and/or partitions located outside the inner peripheral wall, the peripheral arrangement being defined externally by an outer peripheral wall.

A lift by means of a central cushion and peripheral arrangement may be compared with a spring suspension system which would comprise a large central spring (equivalent to the central cushion) of substantially uniform rigidity and a plurality of peripheral springs (able to be compared with the elements of the peripheral arrangement) of non-uniform rigidity and varying from one peripheral element to the next.

By way of example, reference may be made to U.S. applns. Ser. Nos. 212,930 filed Dec. 28, 1971, now U.S. Pat. Nos. 3,811,527, and 536,552 filed Dec. 26, 1974, now Pat. No. 3,951,227, in which a particular example of lift of this type is described.

To simplify the explanation, vehicles comprising a central cushion and a partitioned peripheral arrangement will hereafter be referred to as "air cushioned vehicles of the aforesaid type".

For air-cushioned vehicles of the aforesaid type, French Pat. No. 1,599,638 proposed producing the arrangement of walls and partitions defining the various cushions by juxtaposing adjacent elementary cells, each cell incorporating an outer wall element and an inner wall element, both in the form of lobes, in order to obtain a generally "multilobular" inner wall and outer wall. The essential advantage of vehicles of the aforesaid type resides in the fact that the central cushion provides great comfort with the average flying height not varying in practice.

In the case of vehicles having to travel on water or over very irregular ground, it is nevertheless necessary to provide effective means for preserving and re-establishing a stable flying position i.e. for keeping the platform of the vehicle substantially horizontal, despite the effect of irregularities of the ground or even of the waves.

In U.S. Patent application Ser. No. 598,530 filed 23rd July, 1975 for "Improvements to vehicles riding on air cushions", and assigned to the assignees of the present application, there are proposed various solutions to this problem.

In its most general aspect, the present invention proposes a new solution.

According to the present invention there is provided an air-cushioned vehicle in which the lift of a platform is ensured by an arrangement of cushions, defined by an arrangement of flexible skirts, comprising a central cushion with a substantially constant air pressure and a partitioned peripheral arrangement, in which a ring of closed adjacent skirts is inserted between the central cushion and the peripheral arrangement in order to increase the flying stability of the vehicle.

Preferably, the peripheral arrangement and the closed skirts are supplied in parallel from a diffusion chamber supplied by at least one fan.

Preferably also, the central cushion is supplied with air from the bottom of the closed skirts.

Preferably also, the skirt arrangement is produced by a juxtaposition of individual cells, each cell comprising a substantially cylindrical or frustoconical lobe surrounding a closed skirt on two sides.

Each closed skirt is advantageously made by connecting two cylindrical or frustoconical parts, generally inclined in opposite directions, connected on two sides along their common tangential plane as a triangle or trapezium. Thus, for each said individual cell, the lobe will itself be tangential to the closed skirt along this triangle or this trapezium.

The lower plane of each closed skirt may be located in a plane parallel to that of the peripheral skirts or rise progressively towards the central cushion to facilitate intercommunication of the skirt and central cushion. Generally, the lower edge of the closed skirt, forming a leakage edge at the bottom of the closed skirt, may be raised by a predetermined height with respect to the lowest point of the corresponding lobe which forms the outer wall outside the vehicle. This value may be determined empirically, in particular by study on a mock-up.

The most external generatrix of each lobe forms with the vertical an angle decreasing from top to bottom, this angle varying according to the implantation of the lobe on the vehicle, generally decreasing from the front to the rear of the vehicle.

The invention will now be described by way of example, with reference to the accompanying drawings, in which:

FIG. 2 is a schematic longitudinal sectional view of the vehicle on line II—II of FIG. 1 but without details of the vehicle's skirt;

FIGS. 5a and 5b are pressure diagrams of the vehicle when its position is horizontal and when it is inclined respectively.

Figure 1:
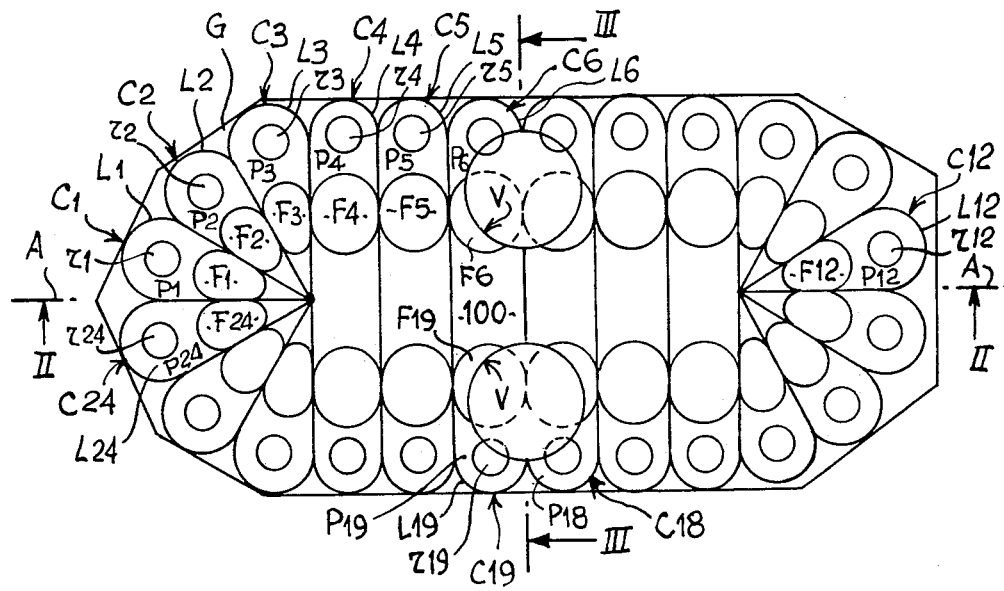
FIG. 1 is a diagrammatic plan view of a vehicle according to the invention, showing the arrangement of the vehicle's skirt.
Figure 3:
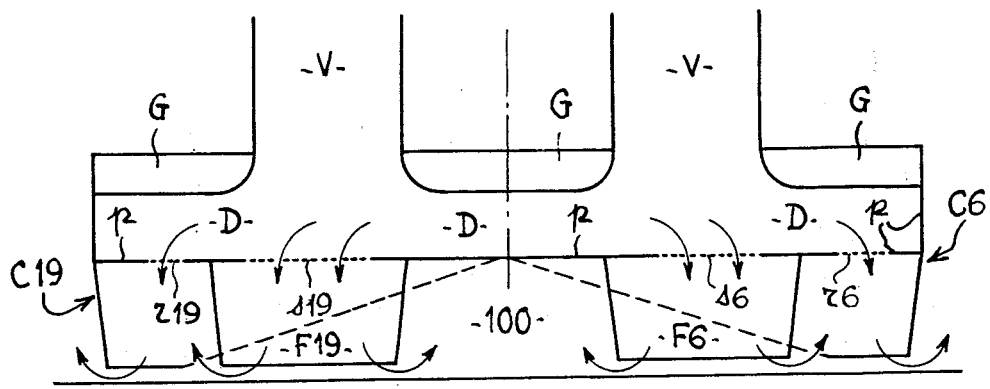
FIG. 3 is a cross sectional view of the vehicle on section line III—III of FIG. 1.

The vehicle illustrated in FIGS. 1, 2 and 3 comprises a platform G supported by air cushions defined by flexible skirts, these type of cushions being known per se. Two fans V, arranged symmetrically with respect to the longitudinal axis A—A of the vehicle supply air under pressure to a diffusion chamber D located below the platform G and defined at its lower and lateral parts by a wall $p$. As will be seen more completely hereafter, this diffusion chamber supplies the various air cushions directly or indirectly. The diffusion chamber D may be optionally partitioned into sectors by means of vertical walls extending from the centre to the periphery of the machine. Reference may be made to U.S. Pat. Nos. 3,811,527 and 3,951,227 as examples of a partitioned diffusion chamber. The advantage of this partitioning is to allow a separate supply of certain regions of cushions. With two fans V, it is possible to partition all the cushions into a left-hand part and a right-hand part.

The system of skirts extending below the wall $p$, and their supply will now be described.

Figure 4:
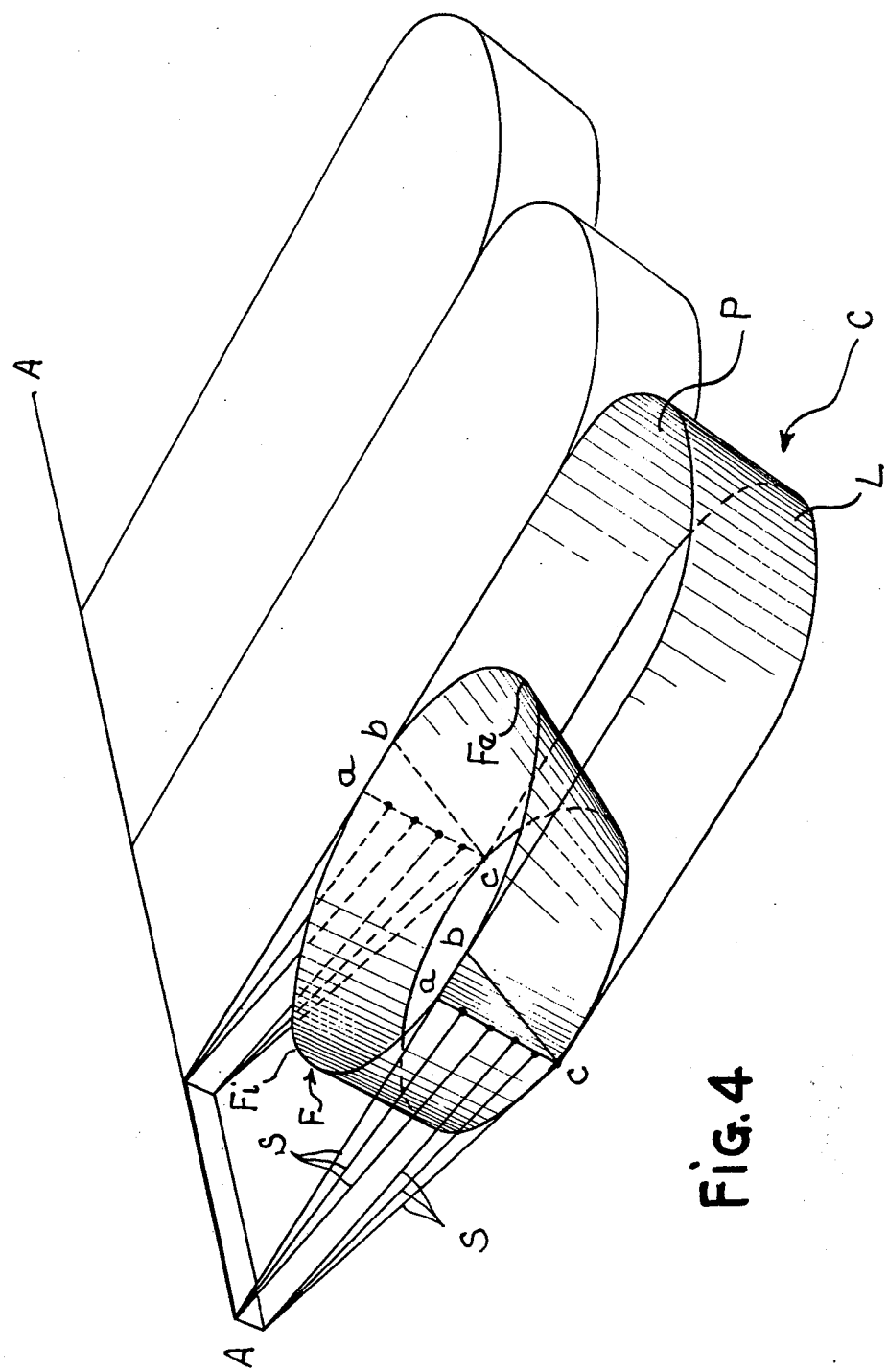
FIG. 4 shows diagrammatically in perspective view, a cell comprising a lobe surrounding a closed skirt.

This system of skirts is constituted by a juxtaposition of cells $C_1$, (...$C_6$...$C_{12}$...), $C_{19}$...$C_{24}$, shown diagrammatically in FIG. 1. FIG. 4 shows in perspective view, the constitution of any one of the cells C which comprises a lobe (forming part of the outer wall on the vehicle) L, laterally surrounding a closed skirt F. The lobe L, which is substantially cylindrical or frustoconical with its generatrices close to vertical, is bilaterally tangential to F in a region sufficient to ensure a seal according to a triangle of contact $a$, $b$, $c$.

As shown, each lobe L has an arcuate shape produced by folding a disc or blank of preferably flexible material. The sides of the lobe are kept under tension by means of straps (or cables) S, connected to rigid parts of the vehicle structure in the vicinity of its longitudinal axis A-A. Alternatively, the straps could be replaced by discs extending along the two sides of the lobe L.

The closed skirt F is produced by the assembly of two half-skirts $F_i$ and $F_e$, which are cylindrical or frustoconical and joined by a connecting sector located in the tangential plane common to the two half-skirts which is the sector or triangle $a$, $b$, $c$.

This sector may be trapezoidal in cases where an desired of the skirt F is elongated. It should also be noted that the skirt F may be made before the assembly, independently of the lobe L, but the part $F_i$ may also be constituted by an extension of the lobe L, the part $F_e$ then being constituted by a connected panel. On the functional plane, the upper opening section of the skirt F is appreciably greater than its lower opening section, to produce a funnel effect. A peripheral sector P whose section is in the form of a crescent, extends at the front of the cell.

The assembly and supply of the various cells $C_1$ to $C_{24}$ below the wall $p$ and the diffusion chamber D will now be explained with reference to FIGS. 1, 2 and 3 where the parts relating to the cells $C_n$ will be systematically designated by the index $n$. The parts and supply of a cell C will be described generally, whilst illustrating the parts of all the cells with their indices in the drawings. FIG. 2 is a section on line II—II of FIG. 1 to show the platform G, but does not show the system of skirts and their supply whereas FIG. 1 shows the cells, such as $C_1$ and $C_{12}$ cut along their central plane of symmetry, and the fan V cut in its axial plane. Likewise, FIG. 3 shows central sections of the cells $C_6$ and $C_{19}$.

All the cells $C_1$ to $C_{24}$ are placed side by side in a ring as shown in FIG. 1, the lobes $L_1$ to $L_{24}$ being tangential to each other and like the closed skirts $F_1$ to $F_{24}$ the arrangement of the peripheral compartments $P_1$ to $P_{24}$ constitutes a peripheral arrangement which is defined externally by the multilobular outer wall constituted by the juxtaposition of various outer lobes L and internally, by the wall constituted by the outer part $F_e$ of the closed skirts F.

The ring formed by the skirts F thus separates the said peripheral arrangement from a central cushion 100, defined by the wall which is constituted by the inner part $F_i$ of the skirts F.

The supply of the peripheral compartments P forming the peripheral arrangement, of the ring of skirts F and of the central compartment 100 by the fans V will now be described.

The compartments P are supplied from the diffusion chamber D through openings $r$ provided in the wall $p$.

The skirts F are supplied from the diffusion chamber D through openings $s$ is provided in the wall $p$. The openings $s$ may be very large and equal in size to the upper section of the skirts F.

The central cushion 100 is supplied from the skirts F by the passage of air below the lower edge of the inner part $F_i$ of the skirts F, as shown by the arrows in FIG. 2. To this end, the lower edge of the skirts F is at least at a vertical distance $h$ from the lowest point of the skirts, which is the extreme point of the lower edge of the lobes L. To facilitate the passage of air from the skirts F to the central compartment 100, the lower edge of the inner part $F_i$ of the skirts F may be raised progressively from the outside to the inside of the vehicle.

As a variation and/or by way of addition, the central cushion 100 may be supplied directly from the diffusion chamber D through openings $t$ provided in the wall $p$.

It is possible to control the size of the openings $r$, $s$, $t$ to regulate the flying position of the vehicle and to combine this effect with adjustable partitioning of the diffusion chamber D, as indicated for example in the above-identified U.S. patents, to which reference may be made.

In the case of a supply by several fans, the control of the flying position may take place by adjusting the operating speed and/or pitch of the fans.

Apart from the advantages inherent in systems having a central cushion, the peripheral arrangement of a ring of closed skirts and a central cushion, has the advantage of great stability in the horizontal position as will be better understood on examining FIGS. 5a and 5b.

These two figures show diagrammatically the pressure variations $\pi$ inside the various air cushions taken in the transverse direction of the vehicle, a diagram of the implantation of the various parts of the cushion being given above the pressure graph.

The two figures show the behaviour of the skirts when the vehicle travels from left to right, the parts located on the left-hand side of the vehicle being designated by the index $g$ and those located on the right by the index $d$.

FIG. 5a illustrates the case where the inclination $\theta$ of the platform of the vehicle with respect to the horizontal is zero ($\theta = 0$). In this case, the distribution of air is symmetrical with respect to the left and right of the vehicle, as shown by the arrows. The central cushion 100 and arrangement of skirts F are all at the same pressure $\pi_1$. In turn, the compartments P of the peripheral arrangement are all at a pressure $\pi_2$ less than $\pi_1$.

When the vehicle is inclined (FIG. 5b), for example as shown when travelling on the right hand side, the air outlets are substantially blocked at the bottom of the compartments $P_d$ and the closed skirts $F_d$. On the contrary, the leakage spaces are increased at the bottom of the compartments $P_g$ and the skirts $F_g$ on the left of the vehicle.

Under these conditions (in the example illustrated in FIG. 5b the inclination of roll $\theta$ is equal to 4°), the field of pressure having the following distribution:

The central cushion 100 and the skirts $F_g$ remain substantially at the pressure $\pi_1$;

the right-hand compartments $P_d$ increase to a pressure $\pi_3$;

the left-hand compartments $P_g$ drop to the pressure $\pi_4$.

In other words, in the case of a roll, the central cushion remains at a substantially constant pressure whereas the outer elements, on either side of the central cushion, have a pressure rise on one side and a pressure drop on the other side. An anti-roll torque is created in this way, which restores the position of the vehicle to the horizontal rapidly and effectively.

Naturally, rolling has been taken solely as an example of the possibilities for the skirt arrangement of the invention, the same possibilities existing for pitching, or for combined movements of rolling and pitching.

In short, the arrangement of skirts according to the invention is particularly suited to a large vehicle intended to convey passengers; the presence of a central cushion giving comfort and enabling variations in the position to be rapidly compensated for.

Naturally, other already known advantageous characteristics combined with the former advantages may be incorporated in the vehicle according to the present invention.

In particular, as described in said U.S. Pat. appln. Ser. No. 598,530 filed July 23, 1975, it is possible to vary the inclination of the outer generatrix of each lobe with respect to the vertical, depending on its position on the vehicle. In particular, FIG. 1 shows that the inclination of the outer generatrix of the lobe $L_1$ located at the front AV of the vehicle is greater than the corresponding inclination of the lobe $L_{12}$ located at the rear AR of the vehicle.

On the other hand, the horizontal section of the various cells varies so that the cells located below the concave parts of the platform G (for example $C_1$, $C_2$, $C_3$) have a horizontal section substantially in the shape of a curvilinear triangle, whereas the cells located below the right-hand parts of the platform G (for example $C_{19}$) have a horizontal section generally in the shape of a curvilinear rectangle.

What is claimed is:

1. An air cushion vehicle comprising:
   a platform,
   a central air cushion region beneath said platform surrounded by a continuous series of peripheral cells, each of said cells including
   an outer lobe and a tubular skirt within said lobe, a portion of each skirt and lobe defining a peripheral sector within each lobe, each skirt having a closed horizontal cross-section and being contiguous with the skirts immediately preceding and succeeding it to define a continuous ring of skirts, said ring of skirts being between said central air cushion region and said peripheral sectors within said lobes, and
   means carried by said platform for providing air under pressure to said central air cushion region, said ring of skirts, and said peripheral sectors within said lobes.

2. A vehicle according to claim 1, comprising at least one air-supply fan, and a diffusion chamber supplied by the latter to distribute air in parallel to the skirts and peripheral sectors.

3. A vehicle according to claim 1 in which the central air cushion region and skirts are in communication at their bottoms so that the former is supplied with air via the latter.

4. A vehicle according to claim 3, in which the central air cushion region is also supplied directly from the diffusion chamber.

5. A vehicle according to claim 1, in which each tubular skirt comprises an inner half-skirt, an outer half-skirt and connecting sectors joining the half-skirts together, the connecting sectors being triangular or trapezoidal and being substantially tangential to the lobes.

6. A vehicle according to claim 5 in which the inner half-skirt is an integral part of the lobe.

7. A vehicle according to claim 1, in which the horizontal and vertical attitudes of the lobes vary according to their location on the vehicle.

8. A vehicle according to claim 1 wherein each tubular skirt has a cylindrical or frustoconical shape.

9. A vehicle according to claim 1 wherein each lobe comprises a blank of flexible material bent to define an arcuate central portion and substantially planar side portions, said side portions engaging said skirt tangentially.

* * * * *